Patented Jan. 22, 1924.

1,481,482

UNITED STATES PATENT OFFICE.

STANLEY JOHN PEACHEY, OF LONDON, ENGLAND.

AGENT FOR ACCELERATING VULCANIZATION OF RUBBER AND METHOD OF PRODUCING SAME.

No Drawing. Original application filed July 15, 1918, Serial No. 245,097. Divided and this application filed October 2, 1922. Serial No. 591,925.

*To all whom it may concern:*

Be it known that I, STANLEY JOHN PEACHEY, a subject of the King of Great Britain and Ireland, residing at Hampstead, London, England, have invented new and useful Improvements in Agents for Accelerating Vulcanization of Rubber and Method of Producing Same, of which the following is a specification.

This invention is a division of application, Serial No. 245097, filed July 15th, 1918, and refers to and consists of (1) new agents for accelerating the vulcanization of rubber or rubber-like substances by sulphur, (2) a method of producing such agents, and (3) the use of such agents in the vulcanization of rubber by sulphur.

According to the invention, the new agents are produced by subjecting a mixture of a paranitroso dimethylaniline homologue and sulphur to heat, which causes a vigorous reaction resulting in two products being obtained, either of which on being added to rubber prior to vulcanization will serve to accelerate the vulcanization.

In carrying out the invention, the homologue of paranitroso dimethylaniline for example paranitroso diethylaniline is mixed with sulphur in quantities corresponding to one molecular proportion of the homologue and from one to two atomic proportions of sulphur, or in proportions differing from these according to the physical nature and condition which the product, or one of the products, is desired to possess, for example, a considerable excess of sulphur may be employed in order to obtain a product containing free sulphur and one which will readily grind to powder, or less sulphur may be employed, when a more resinous product is obtained, which may contain free nitroso compound. The ultimate products possess accelerating action due to the presence of the new agent or agents. The mixture of the homologue of paranitroso dimethylaniline and sulphur in the proportions stated is heated to a temperature of about 130°–135° C., or thereabouts, whereupon a vigorous reaction takes place resulting in the evolution of dense reddish coloured fumes, which condenses on cooling to a yellowish red substance. The residual substance left after the reaction has completed itself is a dark brown resinous substance, soluble in a number of organic solvents. Both the yellowish red condensate and the residual brown resin act as powerful accelerators of the vulcanizing process when a small quantity of either is added to a rubber mixture prior to heating.

As an alternative to the above process, sulphur (preferably in considerable excess of the amount corresponding to one atomic proportion to one molecular proportion of the homologue of paranitroso dimethylaniline) is melted in a suitable vessel, heated to the reacting temperature, and the paranitroso compound is added in small portions at a time with stirring. As soon as the vigorous reaction produced by such addition subsides, a fresh portion is added and so on until the whole of the nitroso compound has been introduced. By using the sulphur in considerable excess of the amount required for the reaction, a residual product is obtained which presents the appearance of a hard dark coloured resin which is readily reduced to a fine powder.

Using an open vessel for the above operation the red fumes are of course dispersed, but the residual mixture contains the brown resinous product and constitutes a most useful accelerator of vulcanization.

In the event of less sulphur being used than is indicaterd by the radio of 1 atomic proportion of sulphur to 1 molecular proportion of paranitroso compound reaction takes place to a certain extent on heating but the product then contains appreciable amounts of free paranitroso compound, which is undesirable in that this free nitroso base possesses objectionable staining properties, whereas one of the objects of this invention is to provide a product which is free from unchanged paranitroso base and therefore does not stain.

The following examples serve to illustrate the processes referred to above, but I do not confine myself to the proportions stated as these may be varied considerably without departing from the invention:

Example 1: 17.8 parts by weight of paranitroso diethylaniline are intimately mixed with 5 parts by weight of powdered sulphur and the mixture is heated in a flask with a side tube leading into a condenser and receiver. As soon as the temperature reaches 130°–135° C., or thereabouts, a vigorous reaction takes place with the evolution of reddish coloured fumes, which partly condense in the condenser and receiver, forming a yellowish red substance; a dark brown resinous substance remaining in the flask. Either product may be employed for the acceleration of vulcanization.

Example 2: 15 parts by weight of sulphur are melted in a dish, the temperature raised to 130°–135° C., or thereabouts, and paranitroso diethylaniline is introduced in small quantities at a time with stirring until an amount equal in weight to the sulphur has been added. Dense reddish coloured fumes escape and are lost (although means may be devised for condensation if desired). The residual product forms on cooling, a hard brittle resin, which powders easily and forms a useful accelerator of vulcanization.

In applying the new agents as accelerators of the vulcanizing process, the procedure is to add either of the new agents in appropriate quantity to the rubber mixture prior to vulcanization, and then to heat the mixture to the vulcanizing temperature by any of the well known methods, when a well vulcanized rubber is obtained in a far shorter time than is the case when the accelerating agent is absent. If desired, allowance may be made for any free sulphur present in the accelerator and this may be deducted from the amount of sulphur added to the mixture.

As examples of proportions the following are given, but I do not confine myself to the proportions specified as variations may be made therein without departing from the invention:

100 parts by weight of plantation rubber.
10 parts by weight of sulphur.
0.5 parts of either of the products obtained according to the direction previously given in Example 1.

The mixture is heated to a temperature corresponding to a steam pressure of from 40 to 45 lbs., when perfect vulcanization is obtained in about 30 to 40 minutes, a much shorter period than is required in the ordinary way; that is, without the addition of the accelerating agent.

Or
100 parts by weight of Pará rubber.
10 parts by weight of sulphur.
1 to 1.5 parts by weight of the residual product obtained according to the direction given in Example 2.

The mixture is heated to a temperature corresponding to a steam pressure of from 40 to 45 lbs., when vulcanization is completed in 30 to 40 minutes, a much shorter period than is required in the absence of the accelerator.

Or
100 parts by weight of plantation rubber.
40 parts by weight of sulphur.
2 parts by weight of the residual product obtained according to the directions given in Example 2.

The mixture is heated for 2 to 3 hours at a temperature corresponding to a steam pressure of 40 to 50 lbs. and a durable hard rubber is thus obtained in about one-third to one-half of the time normally required.

In my former Patent No. 1,157,177 paranitroso dimethylaniline or a homologue of paranitroso dimethylaniline was used directly as an accelerator of the vulcanizing process. In my present invention a homologue of paranitroso dimethylaniline is used, but instead of being used as such is previously converted by heating with sulphur into a new compound or compounds, possessing accelerating properties, and also possessing the important advantage that, unlike paranitroso dimethylaniline and its homologues, it or they are free from objectionable staining properties.

What I claim is:—

1. Materials or agents for accelerating the vulcanization of rubber or rubber-like substances consisting of the condensate produced by heating together a paranitroso dimethylaniline homologue and sulphur to a temperature at which interaction takes place, substantially as described.

2. Materials or agents for accelerating the vulcanization of rubber or rubber-like substances consisting of the condensate produced by heating together a paranitroso dimethylaniline homologue and sulphur to a temperature of approximately 130°–135° C., substantially as described.

3. Materials or agents for accelerating the vulcanization of rubber or rubber-like substances consisting of the condensate produced by heating together a paranitroso dimethylaniline homologue and sulphur in quantities approximating to one molecular proportion of the homologue and two atomic proportions of sulphur, substantially as described.

4. Materials or agents for accelerating the vulcanization of rubber or rubber-like substances consisting of the condensate produced by heating together a paranitroso dimethylaniline homologue and sulphur in quantities approximating to one molecular proportion of the homologue and two atomic proportions of sulphur to a temperature of approximately 130°–135° C., substantially as described.

5. Materials or agents for accelerating the vulcanization of rubber or rubber-like substances consisting of the non-volatile residue produced by heating together a paranitroso dimethylaniline homologue and sulphur to a temperature at which interaction takes place, substantially as described.

6. Materials or agents for accelerating the vulcanization of rubber or rubber-like substances consisting of the non-volatile residue produced by heating together a paranitroso dimethylaniline homologue and sulphur to a temperature of approximately 130°–135° C., substantially as described.

7. Materials or agents for accelerating the vulcanization of rubber or rubber-like substances consisting of the non-volatile residue produced by heating together a paranitroso dimethylaniline homologue and sulphur in quantities approximating to one molecular proportion of the homologue and two atomic proportions of sulphur, substantially as described.

8. Materials or agents for accelerating the vulcanization of rubber or rubber-like substances consisting of the non-volatile residue produced by heating together a paranitroso dimethylaniline homologue and sulphur in quantities approximating to one molecular proportion of the homologue and two atomic proportions of sulphur to a temperature of approximately 130°–135° C., substantially as described.

In testimony whereof I have signed my name to this specification.

STANLEY JOHN PEACHEY.